US006082618A

United States Patent [19]

Brown

[11] Patent Number: 6,082,618

[45] Date of Patent: Jul. 4, 2000

[54] FUEL DISPENSER HARDWARE IDENTIFICATION SYSTEM

[75] Inventor: Ron L. Brown, Georgetown, Tex.

[73] Assignee: Dresser Industries, Inc., Dallas, Tex.

[21] Appl. No.: 09/111,437

[22] Filed: Jul. 8, 1998

[51] Int. Cl.[7] .................................................. G06F 7/08

[52] U.S. Cl. ........................................ 235/381; 235/380

[58] Field of Search ................................ 235/380, 381, 235/375, 441, 492, 487

[56] References Cited

U.S. PATENT DOCUMENTS

| | | |
|---|---|---|
| 4,247,899 | 1/1981 | Schiller et al. . |
| 5,270,943 | 12/1993 | Warn . |
| 5,299,135 | 3/1994 | Lieto et al. . |
| 5,340,969 | 8/1994 | Cox ........................................ 235/381 |
| 5,596,501 | 1/1997 | Conner et al. .................... 364/464.23 |
| 5,700,999 | 12/1997 | Streicher et al. ...................... 235/381 |
| 5,742,229 | 4/1998 | Smith ..................................... 340/438 |
| 5,790,410 | 8/1998 | Warn et al. ........................ 364/479.02 |
| 5,797,470 | 8/1998 | Bohnert et al. ........................... 186/53 |
| 5,913,180 | 6/1999 | Ryan ........................................ 702/45 |

*Primary Examiner*—Thien M. Le

*Attorney, Agent, or Firm*—Haynes & Boone, LLP

[57] ABSTRACT

A multi-product dispenser system includes a pump computer having a software program. A motor-valve drive board is coupled to the pump computer. A sales display is also coupled to the pump computer as is an optional preset. A hardware identifier in each of the computer, motor-valve drive board, sales display and optional preset, is provided to communicate with the software program in the pump computer.

23 Claims, 2 Drawing Sheets

FUEL DISPENSER HARDWARE IDENTIFICATION SYSTEM

BACKGROUND

The disclosures herein relate generally to fuel dispenser systems and more particularly to determining the hardware configuration of a specific fuel dispenser.

Fuel dispensers exist in a wide variety of configurations for dispensing multiple grades of fuel. For example, some dispensers are configured to dispense three grades of fuel, or products, from a three hose dispenser, whereas another dispenser may be configured to dispense three products from a one hose dispenser including a blender.

In the past, a field service technician would spend a substantial amount of time setting up a new dispenser configuration by setting several possible parameters to a certain value, with a limited amount of possible feedback, to enable the dispenser to operate correctly according to its desired configuration. The fuel dispenser, regardless of configuration, contains various electronic hardware devices such as a motor valve board, an LCD display, a fuel selection keypad, a preset module and pulser which controls volumetric measurement. Parameters for each device must be set in order for the desired configuration to function properly.

These electronic devices are becoming more intelligent due to the low cost of microcontrollers. Each intelligent device must be programmed to perform its function and this leads to a proliferation of software features and revisions. It is often necessary for the software to know what devices are present in order for the system to function properly.

For servicing and repairing the dispensers, it would be helpful for the field service technician to know in advance how the system is configured so that proper service equipment can be dispatched for the service call.

Therefore, what is needed is a means for determining how a fuel dispenser system is configured, by identifying specific equipment in the system so as to indicate whether that configuration, as set up, will or will not work properly.

SUMMARY

One embodiment, accordingly, provides a system for identifying specific devices in the configuration which indicates how a particular fuel dispenser system is configured. To this end, a multi-product dispenser system includes a pump computer, a motor-valve drive board coupled to the pump computer, a sales display coupled to the pump computer, and a hardware identifier in each of the computer, motor-valve drive board and sales display for communicating with a software program in the pump computer.

A principal advantage of this embodiment is that by using low cost non-volatile memory, each device in the system can store information that will identify that device. By providing hardware identification information on each electronic assembly in the fuel dispenser, these intelligent devices can operate in harmony in the system without the need for manual setup. This reduces errors and saves time when installing and repairing dispensers.

DETAILED DESCRIPTION OF THE PREFERRED EMBODIMENT

Dispensers exist in a wide variety of configurations, utilizing different electronic devices to dispense fuel. These electronic devices are becoming more intelligent due to the low cost of microcontrollers. Each intelligent device must be programmed to perform its function and this leads to a proliferation of software features and revisions. It is often necessary for the software to know what devices are present in order for the system to function properly. With the advent of low cost non-volatile memory it is now feasible to enable each device to store information that uniquely identifies that device. By having a hardware identification device on each electronic assembly in the dispenser, the intelligent devices can operate in harmony without the need for manual setup. This reduces errors and saves time when installing and repairing dispensers. The non-volatile memory can also hold other information such as repair records, date of manufacture for warranty claims, etc. This information could also be accessed from a remote site using telecommunications. The circuit consists of a $E^2$PROM and the associated circuitry required to interface this device to dispenser electronics.

Figure 1:
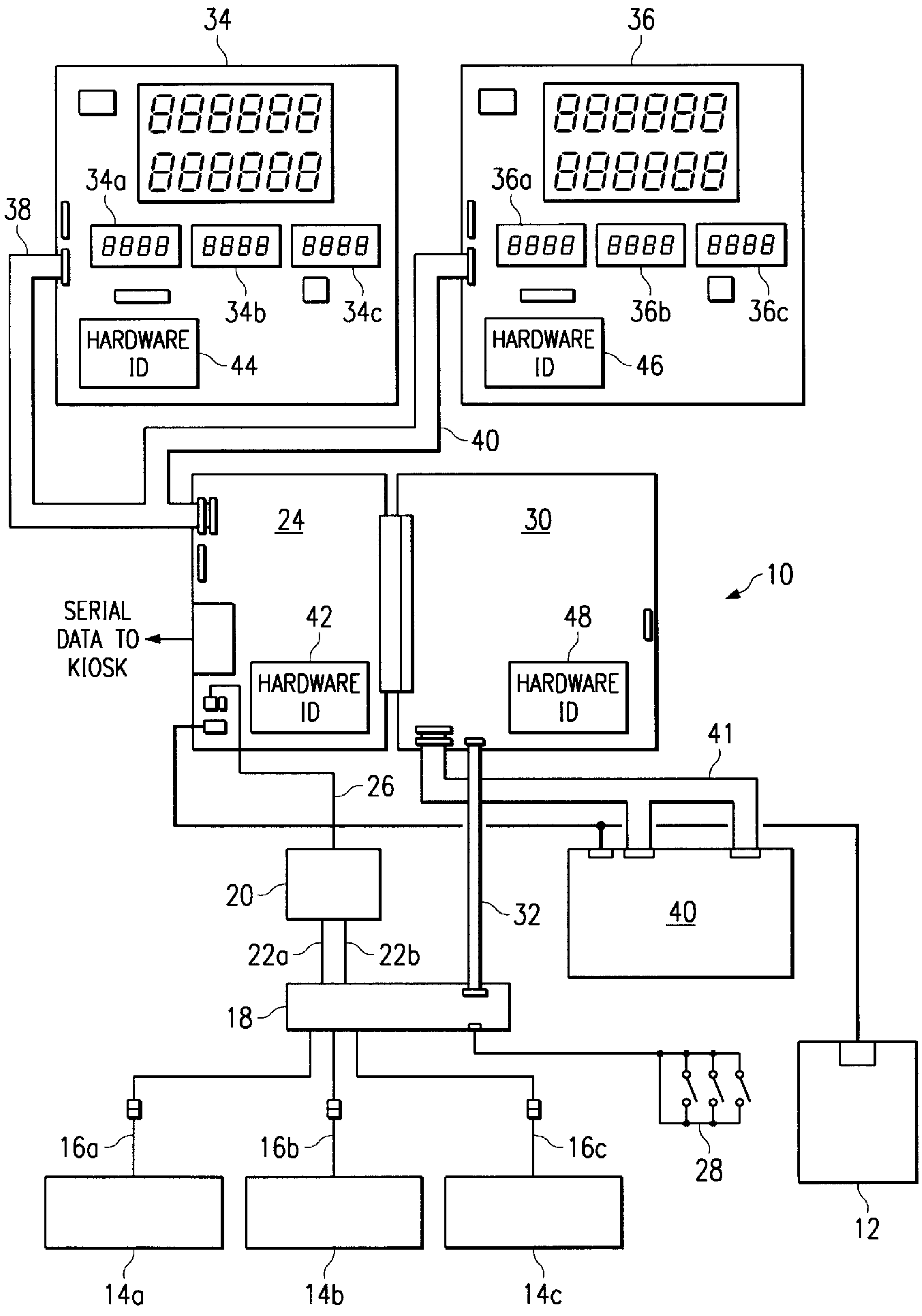
FIG. 1 is a diagrammatic view illustrating an embodiment of a fuel dispenser hardware identification system.

In FIG. 1, a three product dispenser system configuration is generally designated 10. A power supply 12 distributes power to system 10. A plurality of pulsers 14*a*, 14*b*, 14*c*, measure the volume of flow for each of the three products in system 10. Each pulser 14*a*, 14*b*, 14*c* is driven by a respective hydraulic meter (not shown). Signals from pulsers 14*a*, 14*b*, 14*c* pass via a respective communication line 16*a*, 16*b*, 16*c* to an intrinsic safe barrier (ISB) 18 to limit the amount of energy available in the area of system 10 where pulsers 14*a*, 14*b* and 14*c* reside. Signals from the ISB 18 pass to a Mux 20 by way of lines 22*a*, 22*b* Mux 20 converts the signals received to a serial message and transmits the serial message to a pump computer 24 by way of a four wire bus 26 including power, ground and two communication wires.

Signals from nozzle switches 28 are communicated to a motor valve drive board 30 through the ISB 18 by a connection 32 so that the signals from the nozzle switches 28 can be read by the pump computer 24, coupled to the motor valve drive board 30, to determine which nozzle has been selected to enable the appropriate valves to be actuated. As fuel product is actually being dispensed, a stream of messages are communicated from Mux 20, via bus 26, informing pump computer 24 as to the volume of the current sale of product. The pump computer 24, being the central controller of the system, is responsible for controlling system hardware including valves, motors, etc. (not shown), and is also responsible for operating a pair of back-to-back pump sales displays 34 and 36, representing two sides of a fuel dispenser, by way of respective serial bit busses 38, 40. As a result, when a product sale takes place, i.e. fuel is dispensed, a user lifts nozzle switch 28, which is detected by pump computer 24 by reading the nozzle inputs from the motor valve drive board 30 as stated above. An appropriate product display, i.e. high, medium or low octane, is 20 indicated at a display window 34*a*, 34*b*, 34*c* of display 34 or at a display window 36*a*, 36*b*, 36*c* of display 36. When the pump computer 24 commands that a particular valve is to be actuated, the motor valve drive board 30 actuates certain signals that energize corresponding relays on an electromechanical relay board 40, by way of a connection 41, which in turn switch on particular valves that enable a fuel flow path to be opened and also actuate associated submersible pumps (not shown) to pump the selected fuel product.

The pump computer 24 monitors messages from bus 26 while fuel is being dispensed and generates an interrupt so that software operating the pump computer 24 is notified that a message is present. The software then calculates the data that is to be displayed at displays 34, 36, i.e. unit price, sale price, volume dispensed, etc., until the sale ends, i.e. when the nozzle switch 28 is deactivated.

When system 10 is powered up by power supply 12, the software that is operating on the pump computer 24 determines what hardware or version the pump computer 24 is operating on by means of a hardware ID 42. To do this, the software interrogates the pump computer 24 to find out if the resources are available on the current pump computer 24 for the software to run correctly. If not, new software can be installed. There are different versions of displays 34, 36, and variables on such displays include the number of unit prices, i.e. how many products the system 10 will support, and also the number of digits available in the display windows. For example, in various parts of the world, the local currency may require more or less digits of display than in a country having a different currency. Thus, the software in the pump computer 24 needs to know how much data to send out to displays 34, 36 and how many digits are required in the display. Such information is stored in a hardware ID 44 in display 34 and in a hardware ID 46 in display 36. A hardware ID 48 is also provided in motor valve drive board 30. As such, the system software can determine by interrogation of the system 10 at power-up, whether a hardware ID exists, and if it does exist, what version is present. The hardware IDs 42, 44, 46 and 48 are chips which are surface mounted in the respective host component, and comprise a low cost, non volatile memory, e.g. an $E^2$ PROM.

Figure 2:
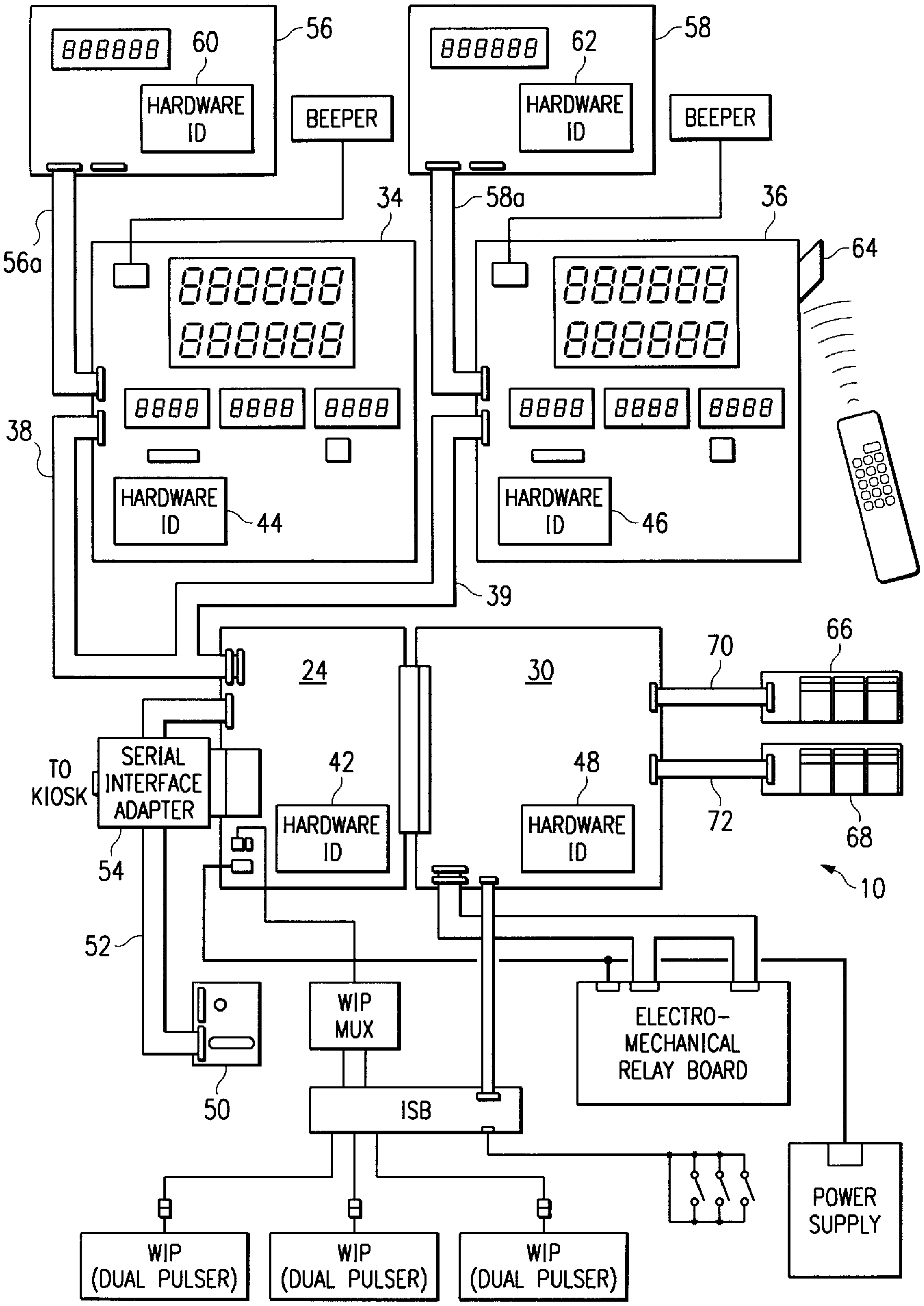
FIG. 2 is a diagrammatic view illustrating another embodiment of a fuel dispenser hardware identification system.

In FIG. 2, a P.C. interface 50 is available for connecting a personal computer (PC) to system 10 for the purpose of conducting an on-site diagnostic analysis of system 10. The PC interface connects to pump computer 24 by means of a cable 52. A pair of presets 56 and 58 provide the ability to preset a particular volume or cash amount into the pump computer 24 by way of connecting lines 56*a* and 58*a* and the ten pin ribbon cables 38 and 39. This enables a user to designate a particular amount of purchase in advance, e.g. ten dollars worth of fuel. A hardware ID 60 in preset 56 and a similar hardware ID 62 in preset 58, so that the system software can determine by interrogation of system 10 at power up, whether a hardware ID exists, and what version is present.

An IR receiver 64 is available to system 10 at display 36 (or at display 34) for the purpose of setting some configurable options at the pump computer 24, e.g. blend ratios, price changes etc., in place of more expensive mechanical switches to set such options. Receiver 64 can also be used to access error logs in system 10 to determine service needs.

A pair of electro-mechanical totalizers 66 and 68 are provided to show a total accumulated volume of each particular product, and are connected to motor-valve drive board 30 by connector cables 70 and 72, respectively.

The software that is installed on the pump computer 24, can communicate with all devices that contain hardware identifiers. It is not uncommon for this pump computer software to be upgraded as new features are added. New revision software does not know in advance the hardware configuration that will be present. When power is applied to the system 10, the software examines the hardware identifier of the pump computer. By doing this, the software can determine the revision level of the pump computer hardware and can determine if the level meets the minimum revision level to support the features that are included in the software. Assuming the pump computer 24 has the capability of running the new version software, the pump computer software continues to examine the remaining hardware in the system. The hardware identifier 48 on the motor-valve board 30 contains information describing the resources available on the motor-valve board 30, e.g. the number of motors and valves, type of vapor recovery system that can be controlled, etc. The sales display hardware identifiers 44, 46 contain information about the number of displays, the number of digits available, the revision level, and the length of the shift register controlling the displays. The length of the shift register does not always match the number of display segments to be controlled, and this information is essential for correct operation of the display. The presets, 56, 58 are examples of an optional piece of hardware. The pump computer software can determine the existence of optional hardware by looking for the presence of hardware identifiers. When the available hardware is known to the pump computer 24, it can determine if the features selected by the field installation technician can be supported. If not, error messages are generated to alert the installer that a problem exists.

Installation of optional hardware is another way that hardware identifiers can be used. Every time power is applied to the dispenser system 10, the pump computer software examines the hardware and if a new item is found, the pump computer software can determine if the new device can be supported. If the device can be supported, the hardware identifier contains the information necessary for the pump computer software to interact with the new device properly. If the device cannot be supported, an error message will alert the installer that a problem exists.

As a result of the foregoing, one embodiment provides a multiproduct dispenser system comprising a pump computer including a software program. A motor-valve drive board and a sales display are coupled to the pump computer. A hardware identifier is in each of the computer, the motor-valve drive board and the sales display for communicating with the software program in the pump computer.

Another embodiment provides a multiproduct dispenser system comprising a pump computer including a software program. A motor-valve drive board, a sales display and a preset are coupled to the pump computer. A hardware identifier is in each of the computer, the motor-valve drive board, the sales display and the preset, for communicating with the software program in the pump computer.

A further embodiment provides a method of identifying a fuel dispenser configuration including installing a hardware identifier in a pump computer component, a motor-valve drive board component and a sales display component in a fuel dispenser system. The system can be powered up along with a software program to interrogate the components to determine if a hardware identifier is present in respective ones of the components. If the hardware identifier is present, it can be determined what version of the respective ones of the components exists.

As it can be seen, the principal advantage of these embodiments is that the system allows for the storage of part number and revision levels that uniquely identify the types of hardware devices in the system. Using low cost non-volatile memory, each device in the system can store information that identifies the device. By providing hardware identification information on each electronic assembly in the fuel dispenser, these intelligent devices can operate in harmony in the system without the need for manual setup. This reduces errors and saves time when installing and repairing dispensers.

Although illustrative embodiments have been shown and described, a wide range of modifications, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed.

What is claimed is:

1. A multi-product dispenser system comprising:

a pump computer including a software program;

a motor-valve drive board coupled to the pump computer;

a sales display coupled to the pump computer; and a hardware identifier in each of the computer, motor-valve drive board and sales display for communicating with the software program in the pump computer, wherein the software program is executable upon a powering up of the dispenser system for interrogating components to determine if an installed hardware identifier is present in respective ones of the components, and upon determining that a hardware identifier is present, determining what version of respective ones of the components exist.

2. The system as defined in claim 1, further comprising a plurality of pulsers connected in the system for measuring the volume of flow for each respective product in the system.

3. The system as defined in claim 2 further comprising an intrinsic safe barrier connected between the pulsers and the pump computer for limiting the amount of energy available proximate to the pulsers.

4. The system as defined in claim 3 further comprising means connected for receiving signals from the intrinsic safe barrier and converting the signals to a serial message and transmitting the serial message to the pump computer.

5. The system as defined in claim 3 further comprising nozzle switches connected for communicating signals through the intrinsic safe barrier and to the motor-valve drive board.

6. The system as defined in claim 4 further comprising nozzle switches connected from communicating signals through the intrinsic safe barrier and to the motor-valve drive board.

7. The system as defined in claim 6 further comprising a preset coupled to the pump computer.

8. The system as defined in claim 1 further comprising an interface connected to the pump computer.

9. The system as defined in claim 7 further comprising a hardware identifier in the preset.

10. The system as defined in claim 7 further comprising an IR receiver coupled to the sales display for setting configurable options at the pump computer.

11. A multi-product dispenser system comprising:

a pump computer including a software program;

a motor-valve drive board coupled to the pump computer;

a sales display coupled to the pump computer;

a preset coupled to the pump computer; and a hardware identifier in each of the computer, motor-valve drive board, sales display and preset for communicating with the software program in the pump computer, wherein the software program is executable upon a powering up of the dispenser system for interrogating components to determine if an installed hardware identifier is present in respective ones of the components, and upon determining that a hardware identifier is present, determining what version of respective ones of the components exist.

12. The system as defined in claim 11, further comprising a plurality of pulsers connected in the system for measuring the volume of flow for each respective product in the system.

13. The system as defined in claim 12 further comprising an intrinsic safe barrier connected between the pulsers and the pump computer for limiting the amount of energy available proximate to the pulsers.

14. The system as defined in claim 13 further comprising means connected for receiving signals from the intrinsic safe barrier and converting the signals to a serial message and transmitting the serial message to the pump computer.

15. The system as defined in claim 13 further comprising nozzle switches connected for communicating signals through the intrinsic safe barrier and to the motor-valve drive board.

16. The system as defined in claim 14 further comprising nozzle switches connected for communicating signals through the intrinsic safe barrier and to the motor-valve drive board.

17. The system as defined in claim 11 further comprising an interface connected to the pump computer.

18. The system as defined in claim 17 further comprising an IR receiver coupled to the sales display for setting configurable options at the pump computer.

19. A method of identifying a fuel dispenser configuration, comprising the steps of:

installing a hardware identifier in a pump computer component, a motor-valve drive board component, and a sales display component in a fuel dispenser system;

powering up the fuel dispenser system;

utilizing software to interrogate the components to determine if a hardware identifier is present in respective ones of the components; and determining what version of respective ones of the components exists after determining that the hardware identifiers are present.

20. The method as defined in claim 19 comprising the further step of coupling a preset component to the pump computer component.

21. The method as defined in claim 19 comprising the further step of coupling an IR receiver to the sales display component.

22. The method as defined in claim 20 comprising the further step of installing a hardware identifier in the preset component.

23. The method as defined in claim 21 comprising the further step of setting configurable options at the pump computer component through the IR receiver.

* * * * *